Aug. 18, 1942.  T. JENSEN  2,293,063
BAND SAW BREAD SLICER
Filed Nov. 25, 1939  4 Sheets-Sheet 1
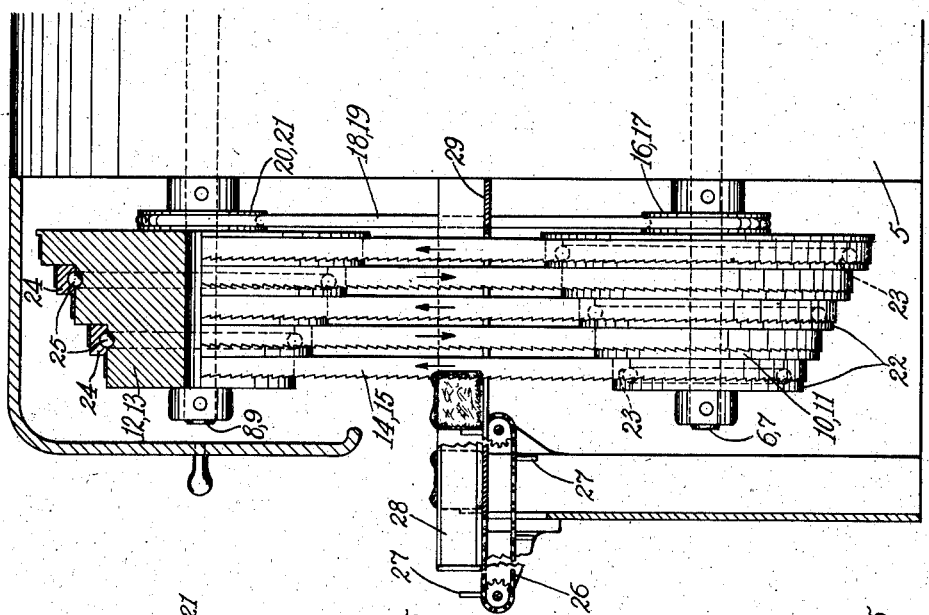
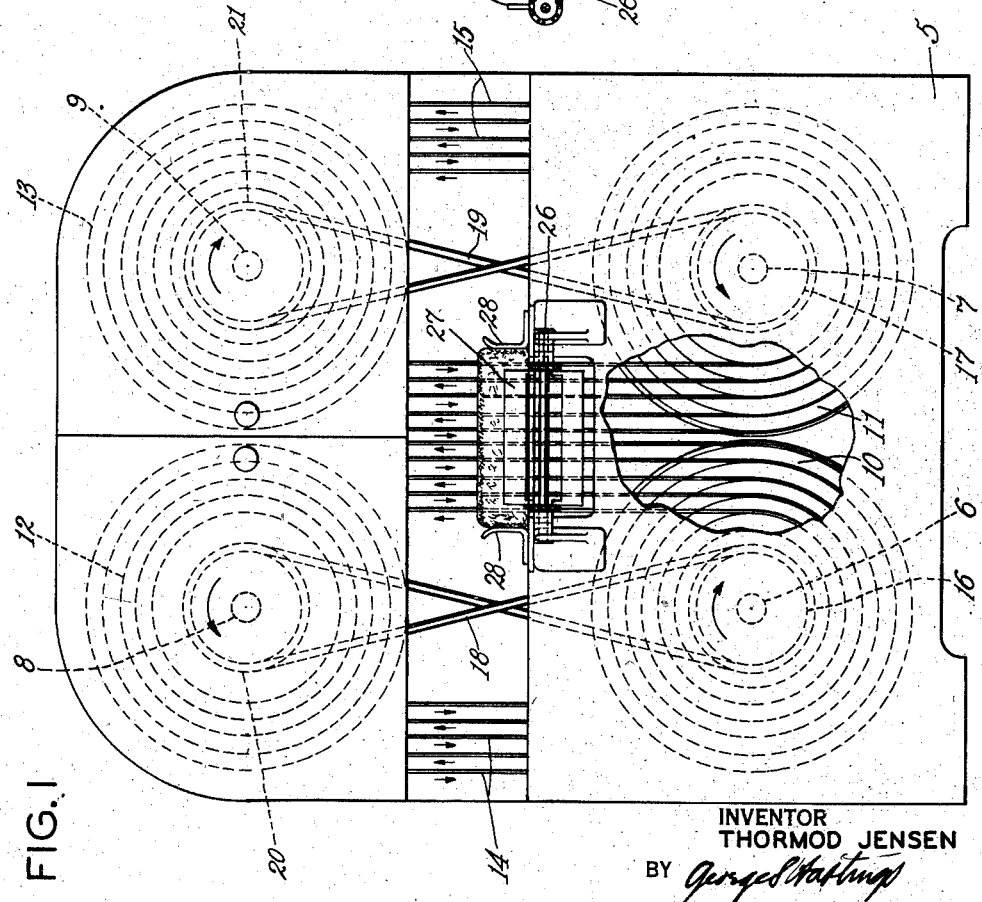
INVENTOR
THORMOD JENSEN
BY
ATTORNEY Aug. 18, 1942.                T. JENSEN                    2,293,063
                         BAND SAW BREAD SLICER
                      Filed Nov. 25, 1939         4 Sheets-Sheet 3
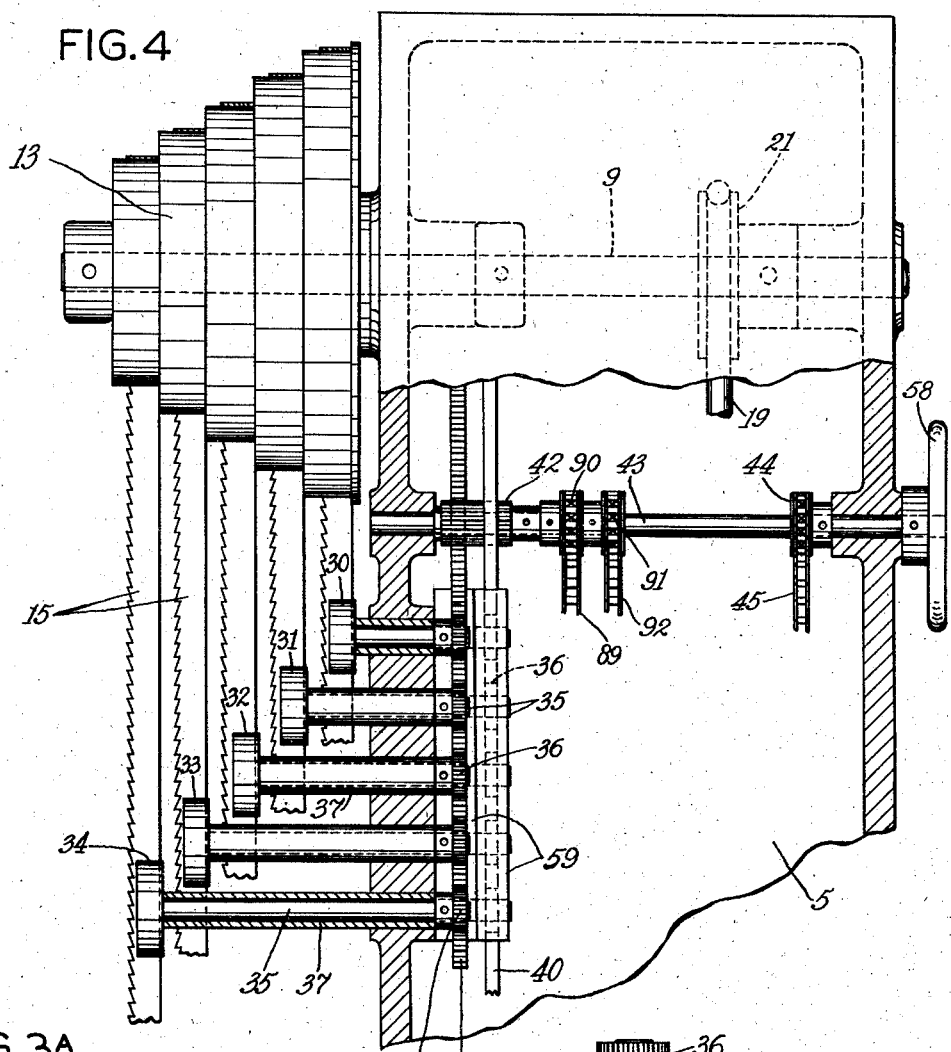
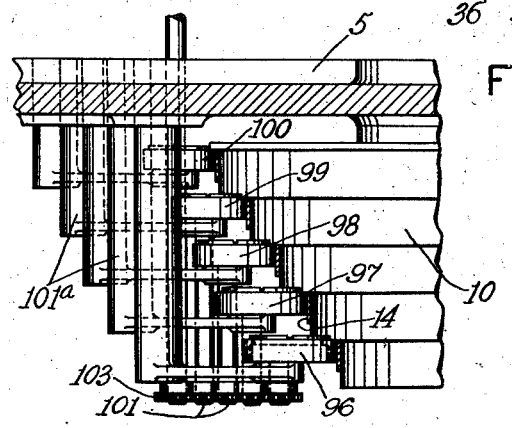
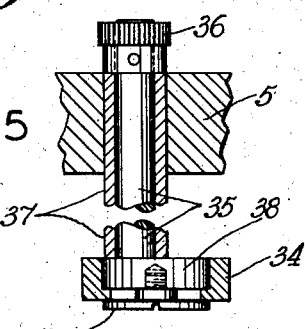
INVENTOR
THORMOD JENSEN
BY George S. Hastings
ATTORNEY Aug. 18, 1942. T. JENSEN 2,293,063
BAND SAW BREAD SLICER
Filed Nov. 25, 1939 4 Sheets-Sheet 4
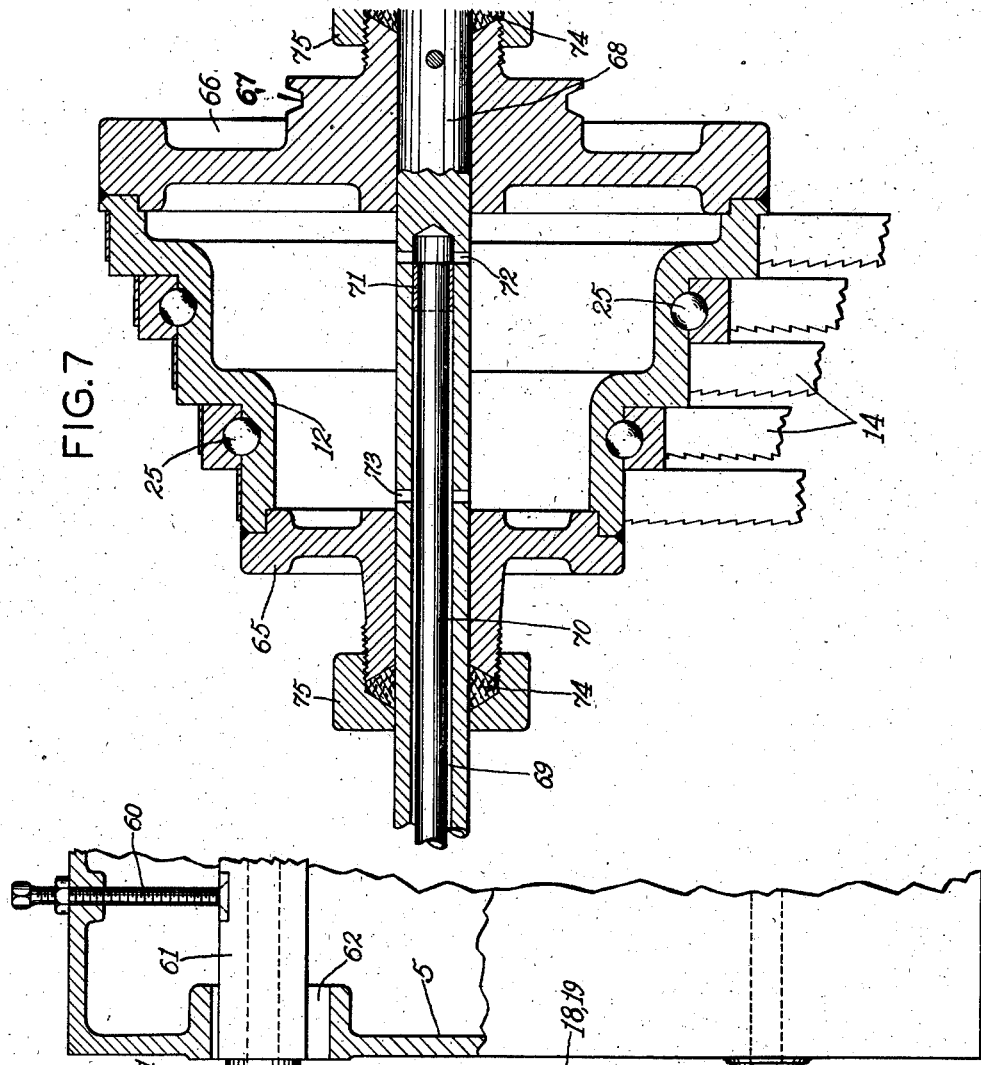
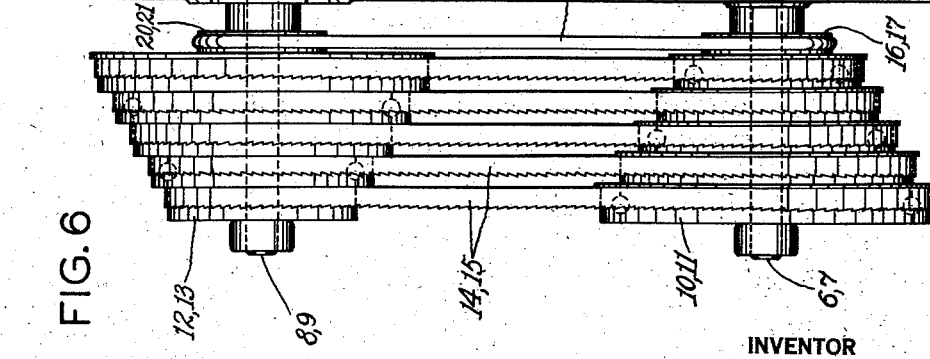
INVENTOR
THORMOD JENSEN
BY *Georges Hastings*
ATTORNEY Patented Aug. 18, 1942

2,293,063

UNITED STATES PATENT OFFICE 2,293,063

BAND SAW BREAD SLICER

Thormod Jensen, Laurelton, N. Y., assignor to American Machine & Foundry Company, a corporation of New Jersey Application November 25, 1939, Serial No. 306,128

5 Claims. (Cl. 146—88)

This invention relates to improvements in slicing machines, more particularly to band saw slicing machines. In various types of band saw slicers devised for slicing bread, it has been found that there is a tendency to collapse the loaf. This is believed to be due to the fact that all the cutting bands travel in the same direction. Accordingly, it is the main object of the invention to provide a construction wherein there is no twisting of the blades and adjacent band saws are driven in opposite directions, so that alternate cutting bands in the cutting region will travel in opposite directions and thereby avoid collapsing the loaf.

Another object of the invention is to use only the taut or pulling runs of the cutting bands for slicing, since the slack runs cause irregular slices which are objectionable. To this end the bands are mounted on two sets of step pulleys and the taut runs of the bands running over one set of pulleys are disposed adjacent the taut runs of the bands running over the other set of pulleys to form the slicing region. Thus the formation of irregular slices is prevented as the loaves are sliced by taut runs which are less likely to be distorted.

A further object of the invention is to provide a band saw construction wherein the spacing of the cutting bands in the cutting region may be adjusted to permit production of slices of various thicknesses.

Still another object is to cool the pulleys whereon the band saws are trained. In the operation thereof in slicing bread the bands become sufficiently heated to cause adhering bread particles to dry and accumulate at the cutting edges and impair the efficiency thereof. By cooling the bands the adhesion of bread particles is minimized.

With these and other objects not specifically mentioned in view, the invention consists in constructions and combinations hereinafter described and set forth in the appended claims.

With these and other objects not specifically mentioned in view, the invention consists in constructions and combinations hereinafter described and set forth in the appended claims.

In the accompanying drawings which form a part of this specification and in which like characters of reference indicate the same or like parts:

Fig. 1 is a front elevation of a slicer embodying the invention;

Fig. 2 is a longitudinal sectional view of the same;

Fig. 4 is a side elevation of the adjusting devices taken from line 4—4 of Fig. 3;

Fig. 5 is a detail view of one of the band spacing rollers;

Fig. 6 illustrates a suitable form of construction for tensioning the band saws;

Fig. 7 is a detail view of a suitable construction for cooling the band saw blades; and Fig. 3a is a detail view on the line 3a—3a of Fig. 3.

Figure 3:
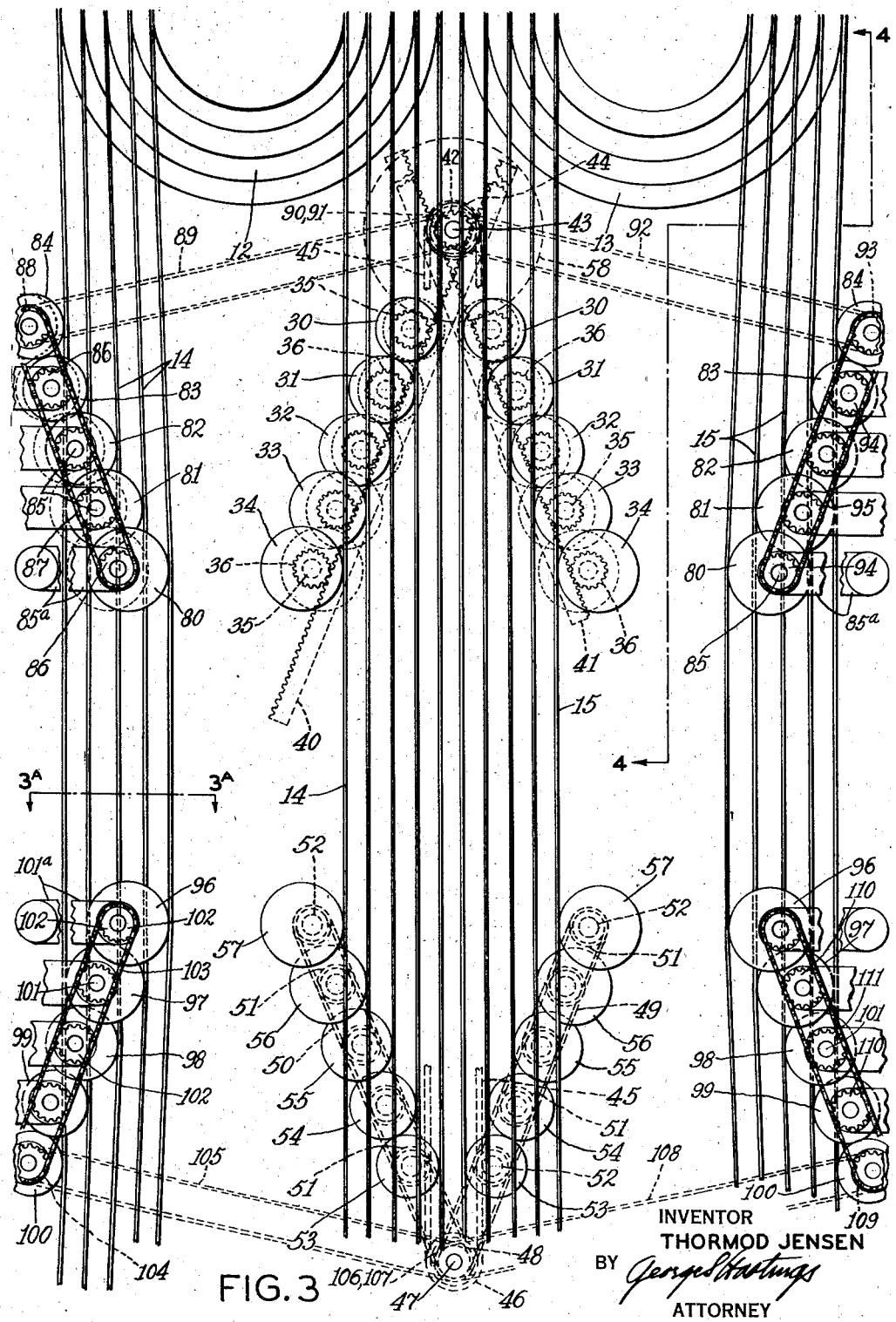
Fig. 3 is a detail view of the devices for adjusting the spacing of the cutting bands in the cutting region.

The improved machine comprises a frame 5 whereon are supported a pair of lower pulley shafts 6, 7 and a pair of upper pulley shafts 8, 9. On the shafts 6, 7 are mounted step pulleys 10, 11 and on the shafts 8, 9 are mounted step pulleys 12, 13. A set of band saws 14 is mounted on the steps of the pulley 10 and guided over the corresponding steps of the pulley 12, and a set of band saws 15 is similarly trained over the steps of pulley 11 and guided over the steps of pulley 13.

Each of the shafts 6 and 7 is suitably driven in opposite directions, and provided with pulleys 16 and 17 respectively, driving crossed belts 18 and 19 running over pulleys 20 and 21 fastened to the pulleys 12 and 13, respectively. Alternate steps of each of the pulleys 10 and 11 are provided with rings 22 free to rotate on balls 23 disposed between the interior of the ring and the pulley (Fig. 2), whereby the band saws running thereover are driven from the integral steps of the pulleys 12 and 13 in a direction opposite to the band saws driven by the integral steps of pulleys 10 and 11. The band saws driven from the integral steps of the pulleys 10 and 11 are guided over rings 24 free to rotate on balls 25 of the corresponding steps of pulleys 12 and 13 (Fig. 2). Thus alternate cutting bands in the slicing region travel in opposite directions, as indicated in Figs. 1 and 2. It will be noted that the taut sides of all the bands constitute the slicing region and are hence less likely to be deflected during the slicing of the loaves.

Endless conveyor chains 26 carry pushers 27 which advance each loaf between guides 28 into engagement with the foremost pair of bands 14, 15, and the loaf is then advanced along the table 29 and through the remaining bands by the following loaves advanced by successive pushers. The table is provided with slots through which the operative runs of the bands pass and is further provided with a slot through which the pushers move downward while they clear the loaf against the foremost pair of band saws. The guides 28 are coextensive with the table and serve to hold the sliced loaves together until they are removed. The conveyor chains are mounted on sprockets supported on a pedestal forming a part of the frame 5 and may be driven by adjustable means (not shown).

For adjusting the spacing of the operative runs of the band saws there are provided adjusting devices (Figs. 3 and 4) comprising two sets of upper spacing rollers 30, 31, 32, 33 and 34 of increasing size, supported on shafts 35 mounted in sleeves 37 carried by the frame 5. The rollers are eccentrically mounted on their shafts which are free to turn in their sleeves, and the eccentricity of the various rollers is proportioned to move the band runs closer together sufficiently to provide a narrowed spacing thereof corresponding to various thinner slice thicknesses. Gears 36 are fastened on the inner ends of the shafts 35, which project inwardly through the front side wall of frame 5, and inclined racks 40 and 41 mesh with each of said sets of gears, respectively. A pinion 42 mounted on a shaft 43, which is journaled in the rear wall of the frame 5, and extending into the angle formed between the upper ends of the racks 40 and 41 and meshes therewith to produce sliding movement thereof when the shaft 43 is turned. Hence the shafts of both sets of gears meshing with these racks will be turned with the adjusting rollers mounted thereon to vary the spacing of the bands.

A sprocket 44 on the shaft 43 drives the sprocket chain 45 running over the sprocket 46 on the shaft 47 which carries a double sprocket 48 driving sprocket chains 49 and 50 which drive sprockets 51 on each of the shafts 52 of the corresponding sets of lower eccentric adjusting rollers 53, 54, 55, 56 and 57. The shafts 52 are mounted in the frame 5 in alignment with their corresponding upper shafts and the eccentricity of the adjusting rollers 53, 54, 55, 56 and 57 conforms to that of their respective upper rollers, so that a uniform displacement of the entire run of each band will be obtained upon turning the hand wheel 58 on the shaft 43.

To provide sufficient slack to permit adjustment of the operative runs of the bands, there are provided upper sets of eccentric tension rollers 80, 81, 82, 83 and 84, and lower sets of eccentric rollers 96, 97, 98, 99 and 100, engaging the idle runs of the bands and serving to keep the bands taut in their various adjusted positions. The upper tension rollers are eccentrically mounted on shafts 85 carried by brackets 85a fastened to the front wall of the frame 5, and each of the shafts 85 of one set thereof carries a sprocket 86 over which runs a sprocket chain 87 for turning the eccentric rollers of this set in unison. The uppermost shaft 85 projects inwardly through the front wall of the frame 5 and is equipped at its inner end with a sprocket 88 driven by a sprocket chain 89 from a sprocket 90 on shaft 43. The shaft 43 also carries a sprocket 91 driving a sprocket chain 92 running over a sprocket 93 on the inner end of the uppermost shaft 85 of the other set which similarly projects inwardly through the frame 5. Each of the shafts of this set is provided with a sprocket 94 over which runs a sprocket chain 95 whereby these shafts may be turned in unison. Hence upon turning the shaft 43 the tension rollers 80, 81, 82, 83 and 84 will be turned simultaneously with the corresponding adjusting rollers 30, 31, 32, 33 and 34, the eccentricity of each tension roll being equal to that of its corresponding adjusting roll and due to the oppositely arranged disposition thereof an amount of slack will be provided sufficient to permit the desired narrowing of the spacing of the operative runs.

Two sets of lower tension rolls 96, 97, 98, 99 and 100 are mounted on shafts 101 carried by brackets 101a. One set of lower tension rolls is mounted on shafts 101 carried by brackets 101a fastened to frame 5 and equipped with sprockets 102 connected by a sprocket chain 103. The inner end of the lowermost shaft carries a sprocket 104 driven by a sprocket chain 105 from a sprocket 106 on shaft 47. The latter also carries a sprocket 107 driving a sprocket chain 108 running over a sprocket 109 on the inner end of the lowermost shaft 101 of the other set of lower tension rolls. Each of these shafts 101 carries a sprocket 110 over which runs a sprocket chain 111. Thus both sets of lower tension rolls will be turned upon turning the shaft 43. Since the eccentricity of the lower tension rolls equals that of their corresponding adjusting rolls, it will be seen that the opposite arrangement of the lower tension and adjusting rolls will provide sufficient slack to permit the adjustment of the lower portions of the band runs to establish a uniform spacing between the sections thereof extending from the upper to the lower adjusting rolls.

The upper pulleys of each set of band saws (Figs. 6 and 7) may be refrigerated and adjustably mounted as shown in Fig. 6 to tension the bands. For this purpose the upper shafts 8, 9 may be mounted in bearing blocks 61 which are supported by screws 60 threaded into the top of the frame 5. Thus the bearings 61 may be raised and lowered in the slots 62 and the upper pulleys may be thus adjusted from the screws 60 to impart the proper tension to the band saws at the various spacings thereof for different slice thicknesses. To prevent drying and accumulation of adhering bread particles on the band saws, their pulleys may be refrigerated or cooled to maintain the temperature of the band saws sufficiently low enough to prevent impairment of their slicing action in this manner. In the form of pulley construction shown in Fig. 7, the flanges 65 and 66 are fastened to the shell 12 whereon the steps are integrally formed and the rings 25 are revolubly mounted. On the hub of flange 66, which is fastened on shaft 68, is formed an integral pulley 67 whereby the shell 12 may be driven in a direction opposite to the lower pulley to drive the bands on its integral steps in a direction opposite to the adjacent bands on the rings 25. The shaft 68 has a counterbore 69 into which the tubing 70 extends and is fastened therein by a bushing 71. The tubing conducts brine or other cooling medium to the inlet ports 72 at the inner end of the counterbore beyond the bushing and communicating with the interior of the pulley. The brine is thus circulated through the pulley and returned through the outlet ports 73 and conducted away in the counterbore outside of the tubing. Leakage of the brine from the pulley is prevented by packings 74 retained upon either end of the shaft 68 by nuts 75 threaded on the hubs of the flanges 65 and 66.

In the construction shown in Figs. 1 and 2, it will be seen that the innermost and the outermost operative runs and the alternate intermediate runs of the bands on pulleys 10 and 12 are driven from the integral steps of the upper pulley 12 and drawn taut upwardly due to the counterclockwise rotation of this pulley. The remaining bands are driven in the opposite direction and have their operative runs drawn taut downwardly due to the clockwise rotation of the integral steps of pulley 10. In the case of the bands on the pulleys 11 and 13, the innermost and outermost operative runs and alternate intermediate runs are driven by the integral steps of pulley 11 and are drawn taut downwardly due to the rotation of this pulley in a counterclockwise direction. The remaining bands are driven in the opposite direction and are pulled taut upwardly by the integral steps of pulley 13 which is driven in a clockwise direction.

It may be noted that since only the taut runs are used for slicing, less tension is needed to sustain the bands in slicing position. As the ineffective or loose runs of the band saws can be looser, there is more range or leeway for adjustment. Moreover the band saws do not heat up as much as when the slack runs are used for slicing in addition to the taut runs, and this is believed due to the greater friction of the slack runs in the loaves. It is believed that when slack runs are pushed through tight guides which maintain them in slicing positon, that buckling of the slack runs results which results in non-uniform slice thicknesses.

What is claimed is:

1. In a bread slicing machine, the combination with members for advancing bread loaves sidewise, of sets of upper and lower step pulleys disposed out of the path of the loaves advanced by said members, and band saws mounted on the steps of said sets of upper and lower pulleys with one run of each band disposed in the path of the advancing loaves with its width extending parallel to said path and its cutting edge facing the oncoming loaves to slice the same, and the other run of each band disposed outside of said path, loose sleeves mounted on the lower pulley of each of said sets and forming alternate steps thereof, loose sleeves mounted on the upper pulley of each of said sets and forming the alternate steps thereof corresponding to the steps intermediate the loose sleeves on the lower pulley of each set, band saws mounted on the corresponding steps of the upper and lower pulleys of each set, and means for driving the upper and lower pulleys of each set in opposite directions whereby alternate bands are driven in opposite directions said pulleys being driven in such directions that all the runs in the path of the loaves are pulled taut, the bands of one set of pulleys aligned with the bands of another set of pulleys for simultaneous coaction in slicing an entire bread loaf.

2. In a bread slicing machine, the combination with members for advancing bread loaves sidewise, of two sets of upper and lower step pulleys disposed above and below the path of the loaves respectively, endless band saws mounted on the steps of each set of upper and lower pulleys with one run thereof extending through the path of the advancing bread loaves with the width of each of said runs extending parallel to said path and the cutting edge thereof facing the loaves to slice the same, the other runs of said band saws being disposed at either side of and out of the path of the advancing loaves, and means for driving said pulleys in directions which will pull taut the band saw runs disposed in the path of the loaves, and means for simultaneously adjusting the two sets of runs intersecting the path of the loaves toward and away from each other to establish various equal spacings thereof corresponding to various thicknesses of slices desired.

3. In a bread slicing machine, the combination with members for advancing bread loaves sidewise, of upper and lower step pulleys disposed out of the path of loaves advanced by said members, and band saws mounted on the steps of said sets of upper and lower pulleys with one run of each band extending through the path of the advancing loaves with its width extending parallel to said path and its cutting edge facing the loaves to slice the same, and the other run of each band being disposed outside the path of said loaves, members engaging the runs disposed outside of said path for tensioning said bands, a series of eccentrically mounted rollers each having a stationary axis engaging the band runs passing through said path, and mechanism for simultaneously turning said rollers to establish various equal spacings of said band runs for various slice thicknesses.

4. In a slicing machine, the combination with pairs of upper and lower pulleys disposed out of the path of oncoming articles, of band saws mounted on each pair of pulleys with their widths disposed in parallelism to said path and their cutting edges facing the oncoming articles to slice them, and means for varying the spacing between adjacent runs of said band saws to divide the articles into slices of various equal thicknesses, said means including eccentrically mounted rollers each having a stationary axis and engaging the adjacent runs of said band saws, and devices for simultaneously turning said rollers for varying the spacing of said runs.

5. The combination with a pair of step pulleys, of band saws mounted on the steps of said pulleys with one run disposed in position to slice oncoming articles and the other run disposed outside of the path of said articles, loose sleeves mounted on one pulley and forming alternate steps thereof, loose sleeves mounted on the other pulley and forming the alternate steps thereof corresponding to the steps intermediate the loose sleeves on the first-mentioned pulley, band saws mounted on the corresponding steps of said pulleys, and means for driving said pulleys in opposite directions whereby alternate bands are driven in opposite directions, said pulleys being driven in such directions that all the runs in the path of the sleeves are pulled taut.

THORMOD JENSEN.